United States Patent
Harris et al.

(10) Patent No.: US 7,215,102 B2
(45) Date of Patent: May 8, 2007

(54) SEMI-CLOCKLESS, CASCADED, CURRENT-MODE POWER REGULATOR HAVING HIGH NOISE IMMUNITY AND ARBITRARY PHASE COUNT

(75) Inventors: Matthew B. Harris, Raleigh, NC (US); Weihong Qiu, San Jose, CA (US)

(73) Assignee: Intersil Americas Inc., Milpitas, CA (US)

(*) Notice: Subject to any disclaimer, the term of this patent is extended or adjusted under 35 U.S.C. 154(b) by 0 days.

(21) Appl. No.: 11/185,353

(22) Filed: Jul. 20, 2005

(65) Prior Publication Data

US 2006/0238179 A1   Oct. 26, 2006

Related U.S. Application Data

(60) Provisional application No. 60/673,081, filed on Apr. 20, 2005.

(51) Int. Cl.
*G05F 1/40* (2006.01)
(52) U.S. Cl. ........................ 323/268; 323/271
(58) Field of Classification Search ........ 323/271–275, 323/268, 224, 282–284; 363/71–72, 54, 363/81–89, 56
See application file for complete search history.

(56) References Cited

U.S. PATENT DOCUMENTS

| | | | | |
|---|---|---|---|---|
| 5,028,824 A | * | 7/1991 | Young | 327/262 |
| 5,973,485 A | * | 10/1999 | Kates et al. | 323/272 |
| 5,982,160 A | * | 11/1999 | Walters et al. | 323/282 |
| 6,043,634 A | | 3/2000 | Nguyen et al. | 323/272 |
| 6,292,378 B1 | | 9/2001 | Brooks et al. | 363/68 |
| 6,366,069 B1 | | 4/2002 | Nguyen et al. | 323/272 |
| 6,396,250 B1 | | 5/2002 | Bridge | 323/283 |
| 6,448,746 B1 | | 9/2002 | Carlson | 323/272 |
| 6,628,106 B1 | | 9/2003 | Batarseh et al. | 323/222 |
| 2005/0073288 A1 | | 4/2005 | Harris | 323/282 |
| 2005/0083024 A1 | | 4/2005 | Harris et al. | 323/282 |

OTHER PUBLICATIONS

International Rectifier, IR3081 Data Sheet, XPHASE VR 10.0 Control IC, pp. 1-20, Sep. 1, 2003.
International Rectifier, IR3086 Preliminary Data Sheet, XPHASE Phase IC With OVP, Fault And Overtemp Detect, pp. 1-15, Sep. 1, 2003.

* cited by examiner

*Primary Examiner*—Rajnikant B. Patel
(74) *Attorney, Agent, or Firm*—Akerman Senterfitt; Neil R. Jetter

(57) ABSTRACT

A semi-clockless, cascaded, current-mode regulator has a first regulator that receives a clock signal from a controller. By 'semi-clockless' is meant that a clock signal is applied to the first of a cascaded plurality of regulators, and that as a result of the cascading of clock delay circuits in each of the regulators, the remaining regulators receive sequentially delayed versions of the clock signal applied to the first regulator. The regulators are coupled to control the operations of associated pulse width modulation controlled switching circuits. Outputs of the switching circuits are combined to realize a multi-phase output voltage.

20 Claims, 2 Drawing Sheets

SEMI-CLOCKLESS, CASCADED, CURRENT-MODE POWER REGULATOR HAVING HIGH NOISE IMMUNITY AND ARBITRARY PHASE COUNT

CROSS REFERENCE TO RELATED APPLICATION

The present application claims the benefit of co-pending application U.S. Ser. No. 60/673,081, filed Apr. 20, 2005, assigned to the assignee of the present application and the disclosure of which is incorporated herein.

The present application relates to subject matter disclosed in co-pending applications U.S. Ser. No. 10/739,757, filed Dec. 18, 2003, entitled "Cascadable Current-Mode Regulator", by M. Harris and U.S. Ser. No. 10/747,833, filed Dec. 29, 2003, entitled "Clocked Cascading Current-Mode Regulator", by M. Harris et al, each application being assigned to the assignee of the present application and the disclosures of which are incorporated herein.

FIELD OF THE INVENTION

The present invention relates in general to pulse width modulator-driven power regulators and/or multi-phase DC-DC converters, and is particularly directed to a 'semi'-clockless, cascaded, current-mode regulator having high noise immunity and arbitrary phase count.

BACKGROUND OF THE INVENTION

Multi-phase or multi-channel power conversion and current-mode control are commonly employed techniques for DC-DC power conversion in today's electronics (e.g. personal computer) market. Multi-phase power conversion provides a cost-effective power solution when load currents cannot be readily supported by single-phase converters. In a multi-phase system, the switching of each channel is timed to be symmetrically out of phase with each of the other channels.

However, the electronics market has now evolved to the point that the number of phases or channels required in a multi-phase power regulator exceeds the number that a single integrated circuit (IC) can practically support. As the phase count grows above four, the IC package becomes large, and the spacing between the power-delivery points and the controller IC exceeds a distance that can support low-level signal integrity and noise rejection. Signal problems result in inaccuracy or necessitate added expense in terms of extra components to suppress noise, layout constraints, and reduced phase count.

One commercially employed method attempts to solve part of the problem—excessive package size—by cascading multiple current-mode regulators, and using a separate controller IC to generate a triangular-shaped signal that is supplied in common to all of the current-mode regulators. Each current-mode regulator initiates its cycle at a respectively different, programmable point on the triangular-shaped signal, in order to achieve the necessary phase separation between adjacent channels. Correct phase separation between the different channels is an important component to multi-phase power conversion.

Another proposed scheme also cascades separate current-mode regulators, but uses digital signalling to communicate between channels. Digital signals are not prone to the same kind of signal degradation or noise susceptibility as analog signals, so that there is no practical limit to the number of phases, or to the physical separation between them. Within the context of this digital signalling approach, there is one implementation that supplies a common clock pulse signal to each of the cascaded regulator channels, with the channels deciding which one will respond to the next clock pulse. In another digital implementation, there is no clock signal supplied by the separate controller IC, making the controller IC a very simple low-cost device. Since there is no clock, this is a unique, self-oscillating system.

The two digital implementations described above solve the problems of noise immunity, large package pin count, and layout difficulty; however, they are both subject to the problem of inadvertent frequency doubling. This problem arises when a noise signal inadvertently causes one of the multi-phase regulators to trigger or 'fire' at the wrong time (i.e., other than when its control signal tells it to fire). If this happens, it creates the sustained situation in which two regulator channels are always firing simultaneously (or nearly so in the clockless case). This effectively doubles the frequency, thereby placing excessive thermal stress in all of the power components.

SUMMARY OF THE INVENTION

In accordance with the present invention, the above-described problem of undesirable frequency multiplication resulting from inadvertent firing of more than one regulator channel at the same time is effectively obviated by a semi-clockless, cascaded, current-mode regulator, which breaks the ring-configured regulator architecture described above, controllably supplies a clock signal from the separate controller IC to only the first channel regulator of a cascaded plurality of regulator channels, and then allows that clock signal to sequentially propagate down the cascaded regulators by means of a programmable delay in each channel regulator. By 'semi-clockless' is meant that a clock signal is applied directly to less than all (only the first) of the cascaded regulators of the cascaded chain, and that the remaining regulators receive sequentially delayed versions of the clock signal that is applied to the first regulator.

For this purpose, the first channel regulator and each downstream channel regulator has a phase input port coupled to the input of a programmable delay and a phase input port couple to the output of the programmable delay. When the clock signal from the controller IC is applied to the phase input port of the first channel regulator, that regulator fires. After the expiration of the delay programmed into the delay of the first channel regulator, the clock signal used to fire the first channel is output from that channel's programmable delay to its phase output port. Since the channel regulators are cascaded by way of their phase input and phase output ports, the programmably delayed clock signal from the first channel regulator will be applied to the phase input port of the second channel regulator, causing the second channel to fire.

Next, after expiration of the programmable delay for the delay of the second channel regulator, the delayed clock signal that caused the second channel to fire is output from the second channel's programmable delay to its phase output port and thereby coupled to the phase input port of the third channel regulator, causing the third channel regulator to fire. This process is sequentially repeated down the chain of cascaded channel regulators to the last or Nth channel regulator. The clock signal output by the controller IC to the first channel regulator is such that a control transition in the clock signal that causes the first channel regulator to fire is timed to occur simultaneously with what would be a corresponding transition in the delayed clock signal as produced by the delay in the Nth channel regulator. The separate controller IC is coupled in a feedback loop that monitors the load and controls the operation of the regulator channels.

DETAILED DESCRIPTION

Figure 1:
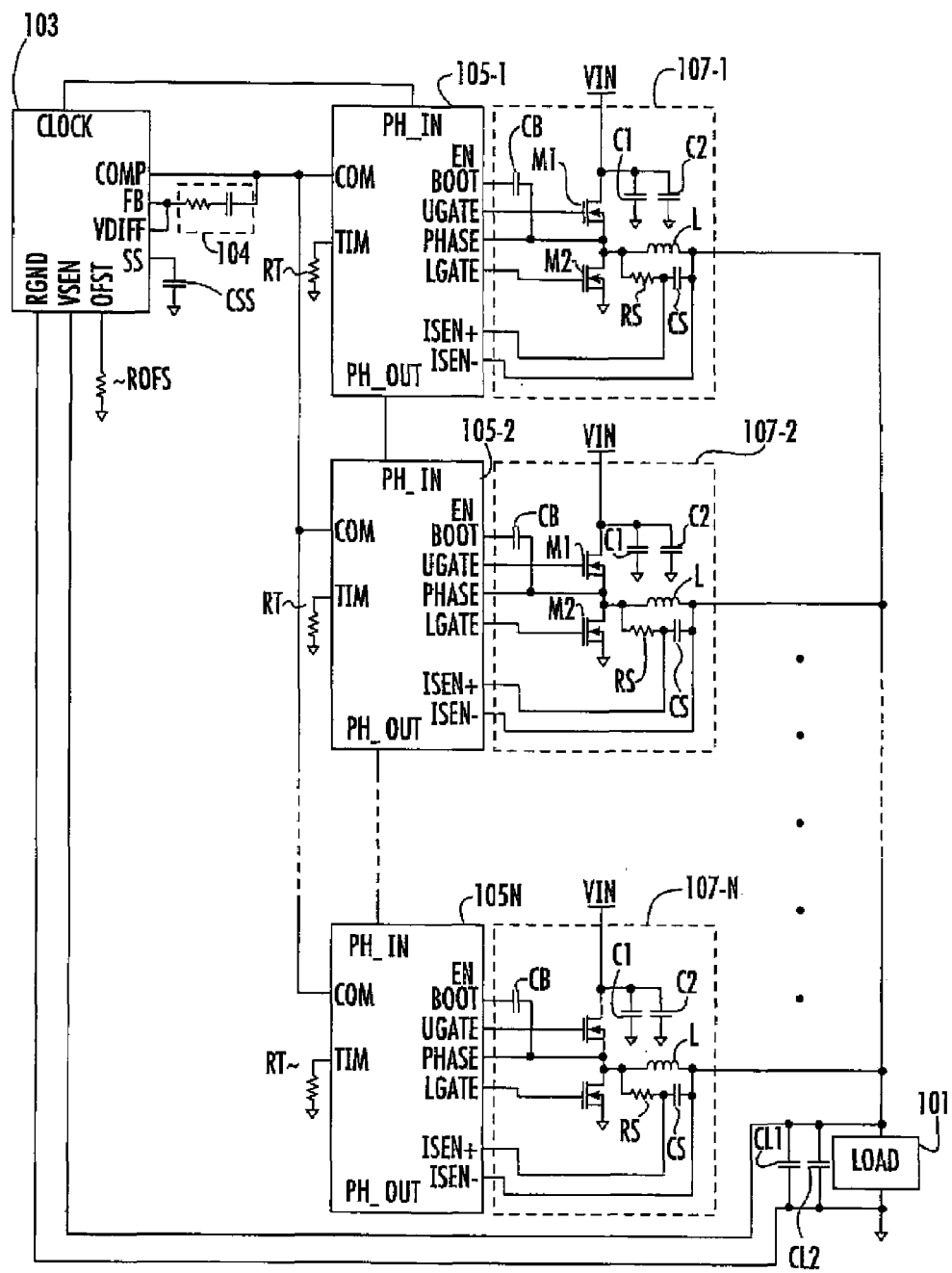
FIG. 1 is a schematic diagram of a semi-clockless, cascaded, current-mode regulator in accordance with an exemplary embodiment of the present invention.

Attention is initially directed to FIG. 1, which is a schematic diagram of a semi-clockless, cascaded, multiphase DC-DC converter 100 according to an exemplary embodiment of the present invention. Converter 100 is operative to develop a load voltage VL across a load 101 referenced to ground (GND). A pair of load capacitors CL1 and CL2 is coupled between VL and GND in parallel with the load 101. The VL signal is fed back to a voltage sense (VSEN) pin of a controller 103 (to be described in detail below with reference to FIG. 3), which also has a ground (RGND) pin coupled to GND. The term 'pin' is used herein to reference a connection to a device, where the connection may be an input, an output or both (generally, an input/output or I/O connection). The device may be implemented as a chip or IC with I/O pins, although discrete implementations are also contemplated.

The controller 103 has a COMP pin providing a COMP signal to a COM (Command) pin of each of a plurality of N current-mode regulators 105-1, 105-2, ..., 105-N (to be described in detail below with reference to FIG. 2) coupled in a cascade configuration, by way of interconnected phase output (PH_OUT) and phase input (PH_IN) pins thereof. A series-coupled resistor-capacitor (RC) circuit 104 has one end coupled to the COMP pin and another end coupled to a feedback (FB) pin and to a VDIFF pin of the controller 103. The controller 103 also includes a soft-start (SS) pin coupled to one end of a soft-start capacitor CSS, which has its other end coupled to GND. The controller 103 further includes an offset (OFST) pin coupled to one end of an offset resistor ROFS, which has its other end coupled to GND.

As pointed out above, each of regulators 105-1, ... 105-N has a phase input (PH_IN) pin and a phase output (PH_OUT) pin, with the PH_OUT pin of each regulator 105-$i$ is coupled to the PH_IN pin of the next succeeding regulator (105-$i$)+1, and the sequence continues until the PH_OUT pin of the next to last regulator is coupled to the PH_IN pin of the last regulator 105-N. The PH_OUT pin of the Nth regulator is left open. Each regulator of regulators 105-1, ..., (105-N)-1 asserts a digital signal on its PH_OUT pin, which provides superior signal integrity as compared to prior methods which employ analog signals. Each regulator 105-$i$ forms an individual channel of the converter 100 and incorporates a driver circuit that drives a corresponding one of N PWM switch circuits 107-1, 107-2, ..., 107-N, that collectively develop the VL signal. Only one of the switch circuits 107-1, ..., 107-N will be described, it being understood that each of the N switch circuits 107-1, ..., 107-N is substantially the same.

Each regulator 105-$i$ includes multiple pins coupled to a corresponding switch circuit 107-$i$, including a bootstrap (BOOT) pin, an upper gate (UGATE) pin, a phase (PHASE) pin, a lower gate (LGATE) pin, and a pair of differential current sense input pins, that include a negative polarity current sense (ISEN−) pin and a positive polarity current sense (ISEN+) pin. Within a respective switch circuit 107-$i$, a bootstrap capacitor CB is coupled between the BOOT and PHASE pins. The UGATE pin is provided to the gate of a first switch M1 and the LGATE output pin is provided to the gate of a second switch M2. In the embodiment shown, switches M1 and M2 are implemented as N-channel metal-oxide semiconductor, field-effect transistors (MOSFETs), although other types of switches including bipolar switching devices, are contemplated as being suitable for IC fabrication. A power source input voltage terminal VIN is coupled to the drain of first switch M1, having its source coupled to the PHASE pin of the regulator 105-$i$ and to the drain of second switch M2. A pair of noise reduction capacitors C1 and C2 is coupled between voltage terminal VIN and GND. The source of switch M2 is coupled to power ground (PGND), where the power ground PGND is shown as separate from signal ground GND as known to those skilled in the art. The VIN signal is typically on the order of twelve volts (12 V), although other voltage levels are contemplated.

The PHASE pin is coupled to one end of an output inductor L and to one end of a sense resistor RS. The other end of the sense resistor RS is coupled to the ISEN− pin and to one end of a sense capacitor CS. The other end of the sense capacitor CS is coupled to the ISEN+ pin of the regulator 105-$i$, and to the other end of the output inductor L, which develops the VL signal. In this manner, the output sides of the output inductors L of all of the switch circuits 107-1, ..., 107-N are coupled together at VL and to the ISEN+ pin of each regulator 105-$i$. Each regulator 105-$i$ includes a timing (TIM) pin coupled to one end of a delay programming component, shown as time constant setting resistor RT, which has its other end coupled to GND. The value of the resistor RT in combination with an internal capacitance of the delay circuit within the regulator sets the propagation delay of the clock signal through that regulator. The output inductor L is configured in any suitable manner as known to those skilled in the art, such as an individual inductor, a primary inductor of a transformer, an inductor with a core, etc.

Figure 2:
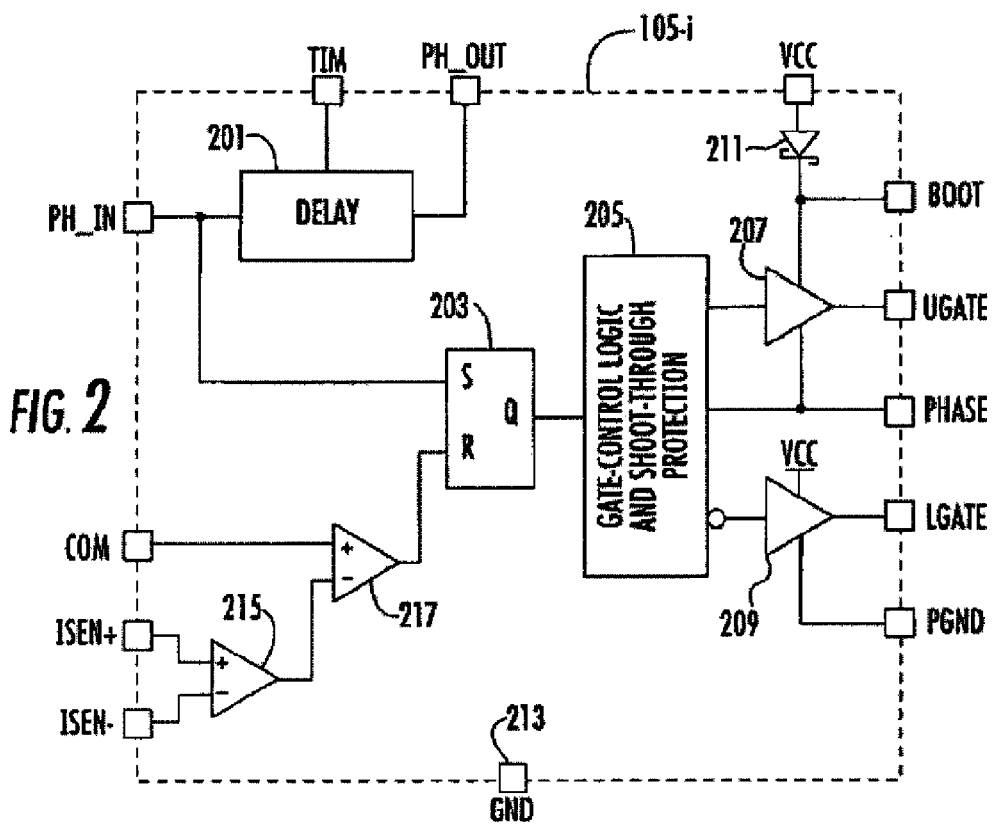
FIG. 2 is a schematic diagram of an exemplary embodiment of a respective one of the current-mode regulators of FIG. 1.

FIG. 2 is a schematic diagram of an exemplary embodiment of a respective channel's current-mode regulator 105-$i$. The PH_IN input pin is provided to an input of a programmable delay circuit 201, which is coupled to the TIM pin and has an output coupled to the PH_OUT output pin of the regulator. The PH_IN input pin is also coupled to the set input S of a latch 203, which is implemented as a set-reset flip-flop (SRFF) in the embodiment shown, although any suitable latch, flip-flop or storage device is contemplated. The latch 203 has its Q output coupled to an input of gate control logic circuit 205. Gate control logic circuit 205 has a first output coupled to the input of a first driver amplifier 207 and a second (inverted) output coupled to the input of a second driver amplifier 209. Gate control logic 205 provides pulse-width modulation (PWM) control of the switches M1 and M2 and also provides shoot-through protection, with which those skilled in the art are familiar. Regulator 105-$i$ has a VCC pin for coupling to and receiving a VCC supply voltage, which is provided to the anode of a Schottky diode 211 and to the positive power input of the amplifier 209. The VCC supply voltage, referenced to GND, is assumed to be the supply voltage for all logic circuits of the regulator. The cathode of Schottky diode 211 is coupled to the positive power input of amplifier 207 and to the BOOT pin. The negative power input of amplifier 207 is coupled to the PHASE pin, and the negative power input of the amplifier 209 is coupled to a separate power ground pin PGND, which is coupled to PGND. The output of amplifier 207 is coupled to the UGATE pin and the output of amplifier 209 is coupled to the LGATE pin of the regulator.

Regulator 105 has a separate signal ground pin (GND) shown at 213 for coupling to GND. The ISEN+ pin is coupled to a non-inverting input of a current sense amplifier 215, having its inverting input coupled to the ISEN− pin. The output of amplifier 215 is coupled to the inverting input of a comparator amplifier 217. The non-inverting input of the comparator amplifier 217 receives the COMP signal via the COM pin and the output of the comparator amplifier 217 generates a reset (RST) signal, which is supplied to the reset (R) input of the latch 203. Latch 203, the gate control logic 205 and the amplifiers 207 and 209 and supporting circuitry collectively implement PWM logic or a PWM switching circuit suitable for controlling a corresponding one of the switch circuits 107 for PWM operation as known to those skilled in the art. Amplifiers 215 and 217 implement feedback sense logic or feedback comparator logic that asserts the RST signal when a control condition is met, such as an output current or voltage condition at the output of the converter 100. The PWM logic and the feedback sense or comparator logic collectively form a PWM control circuit or PWM control logic.

In accordance with the operation of the regulator 105-$i$, a rising edge applied to the PH_IN pin sets the Q output of the latch 203 high, which causes the gate control logic 205 to initiate a PWM cycle. In the particular embodiment illustrated, the gate control logic 205 turns off amplifier 209, so as to turn off the lower switch M2, and then turns on the amplifier 207 so as to turn on upper switch M1. Current is supplied to the load 101 from input voltage terminal VIN by way of the output inductor L. The controller 103 senses the voltage of the VL signal to develop the appropriate level of the COMP signal provided to the comparator amplifier 217. In an alternative embodiment, the COMP signal may be a static or steady state reference signal. In the configuration illustrated, the current through inductor L is sensed by amplifier 215, so that when the peak current causes the output of the amplifier 215 to become equal with the COMP signal, comparator 217 asserts the RST signal, so as to reset latch 203, which drives its Q output low, so as to terminate the PWM cycle. In particular, when the Q signal is pulled low, in response to resetting latch 203, gate control logic 205 turns off amplifier 207, so as to turn off the upper switch M1, and turns on amplifier 209, so as to turn on switch M2. The resistor ROFS allows a designer to program a DC offset of a reference signal REF within the controller 103, where the REF signal is further described below.

In addition to controlling the operation just described, the rising edge of the clock signal at the PH_IN pin initiates the delay period of the delay circuit, where the delay period is programmable via the timing resistor RT coupled to the TIM pin, as described above. When the delay period has expired, the delay circuit supplies the rising edge of the delay clock signal to the PH_OUT pin, so as to initiate the same sequence of events to in the next downstream regulator 105-$i$ of converter 100. A full cycle occurs when each of the plurality of regulators 105-1, . . . , 105-N has completed one full delay period. Namely, the next cycle of regulator 105-1 does not start until triggered by the rising edge of the next clock signal applied to its PH_IN pin from the control logic IC 103. As pointed out above, if each of the N regulators 105-1, . . . , 105-N is programmed with a delay time of TD, and the next rising transition in the clock signal applied to the PH_IN pin of the first regulator 105-1 is simultaneous with the expiration of the delay in the downstream-most or last regulator 105-N in the chain, then the switching period of the converter 100 is the product N×TD. The switching frequency of the converter 100 is therefore 1/(N×TD). In order to obtain a desired switching frequency FSW, each of the N regulators 105 is programmed with a delay time of TD=1/(N×FSW).

As described above, in the illustrated embodiment, converter 100 comprises N channels, each implemented with a regulator 105-$i$ and an associated switch circuit 107-$i$. The delay circuit 201 of each regulator may be programmed with the same delay to establish the target FSW. Each channel effectively operates in an independent manner, such that the next channel may be activated while the previous channel is still operating to drive the load. The delay is preferably the same for each channel to synchronize operation and to evenly distribute the load. In this manner, because of the cascaded configuration, each channel is activated in a synchronous manner, although each channel deactivates based on its own sense condition.

Many variations of the particular embodiment illustrated are possible as would be understood by those skilled in the art. The delay circuit 201, for example, may be configured in any manner known to those skilled in the art to provide a suitable timing function, either fixed or as described above, preferably programmable. The delay circuit 201 may alternatively be configured to be programmed using a capacitor or other component coupled via the TIM pin rather than the resistor RT. Also, the delay circuit 201 may be configured to have a fixed delay or otherwise configured with an internally programmable mechanism to program the desired delay period. The particular embodiment illustrated detects peak current through the output inductor L as the output control condition to control each PWM cycle. In the peak current method, each PWM cycle is initiated by digital logic and terminated based on the control condition. Many alternatives are possible and contemplated, such as other current methods or methods based on sensing voltage conditions, and the sensing device may be other than current or voltage of the output inductor L. Other current methods include an average current mode or a valley current mode. In a valley current mode, for example, each PWM cycle is initiated by an output control signal associated with low or valley current and terminated by a logic signal or condition. The present invention is not limited by any particular PWM control method.

Figure 3:
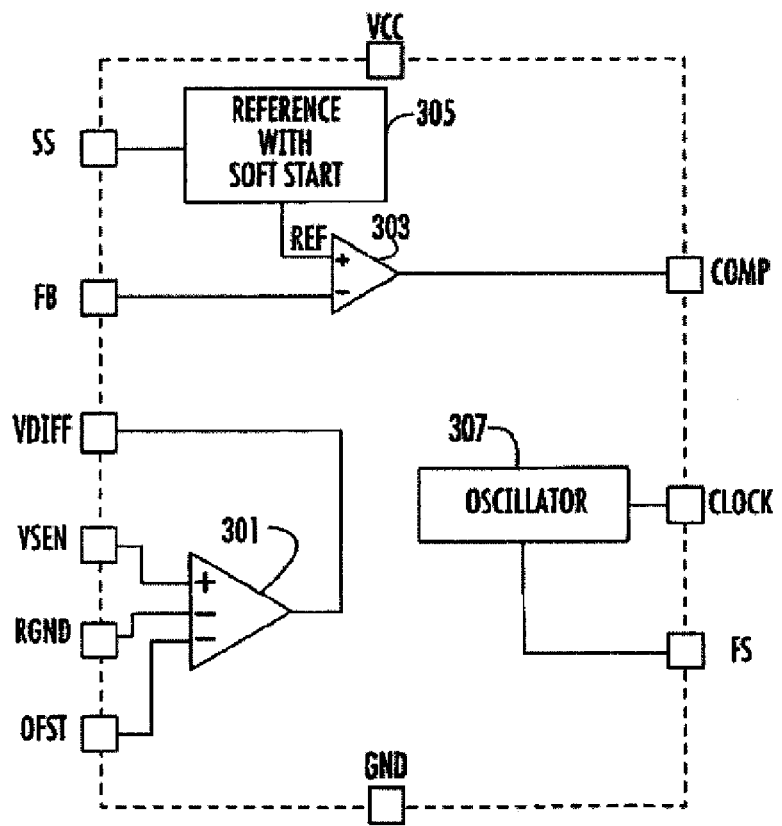
FIG. 3 is a schematic diagram of an exemplary embodiment of the controller IC of FIG. 1.

Attention is now directed to FIG. 3, which is a schematic diagram of an exemplary embodiment of the controller IC 103 according to the present invention. In one embodiment, the controller 103 is implemented as a separate chip or IC with VCC and GND pins for coupling to the VCC source voltage and GND, respectively. In an alternative embodiment, the control circuitry of the controller 103 may be included in one of the regulators 105. The VSEN pin is coupled to the non-inverting input of an amplifier 301, which has an inverting input coupled to the RGND pin. The amplifier 301 senses the load voltage VL and generates an output signal provided to the VDIFF pin. The amplifier 301 also includes another offset input (inverting input) coupled to the OFST pin for enabling control of a DC offset of the REF signal via the resistor ROFS. Amplifier 301 is a differential remote-sense amplifier and may be configured as a unity gain amplifier as known to those skilled in the art. In the embodiment shown, the VDIFF pin is coupled to the FB pin, which is coupled to an inverting input of an error amplifier 303. The soft start SS pin is coupled to an input of a reference with soft start logic 305, which has an output providing the REF signal to the non-inverting input of amplifier 303. The output of error amplifier 303 is coupled to the COMP pin for providing the COMP signal. The capacitor CSS controls a soft start time to initiate PWM operation of the controller 103.

To generate the clock signal CLOCK, the controller IC includes an oscillator 307, which has its output coupled to a CLOCK pin, and its frequency-setting input coupled to an FS pin. To set the frequency of the oscillator 307 the FS pin is coupled to an external timing control elements such as a resistor or capacitor, as familiar to those skilled in the art. As described above, the frequency of the clock signal is established so that, with each of the N regulators 105-1, . . . , 105-N programmed with a delay time of TD, the next rising transition in the clock signal applied to the PH_IN pin of the first regulator 105-1 will be simultaneous with the expiration of the delay that would be produced in the downstream-most or last regulator 105-N in the chain, whereby the switching period of the converter 100 is the product N×TD, making the switching frequency of the converter 100 1/(N×TD).

As will be appreciated from the foregoing description, the 'semi-clockless' cascaded, multi-channel regulator according to the present invention provides a low cost technique of cascading an arbitrary number of phases in a multi-phase DC-DC regulator/converter system. The controller IC provides a clock signal to only the first regulator channel, so that the overall architecture can be configured in a very simple and low-cost device. By eliminating an oscillator ring, there is no danger of a noise signal inadvertently causing one of the multi-phase regulators to trigger or 'fire' at the wrong time, thereby preventing a sustained situation in which two regulator channels are always firing simultaneously (or nearly so in the clockless case). Thus there is no danger of multiplying (e.g., doubling) the intended output frequency, whereby excessive thermal stresses are avoided.

The design of the controller IC is very simple and can be configured in an even simpler manner with a single error amplifier. Each regulator includes a digitally controlled programmable delay unit that receives a digital input and supplies a digital output to the next regulator in the chain of cascaded regulators. The simple digital interfaces (e.g., PH_IN and PH_OUT) provide a significant level of noise immunity as compared to prior methods that employ a common analog signal. As noted above, digital signals are not prone to the same kind of signal degradation or noise susceptibility, so that there is no practical limit to the number of phases nor the physical separation between the regulators. The phase count is arbitrary since any number of regulators may be coupled in cascade, as compared to prior techniques having a relatively low phase count and/or switching frequency.

The target switching frequency FSW for the multi-phase or multi-channel converter is achieved by dividing the period by the number of channels and programming each regulator with the appropriate delay. Other benefits are possible, such as unique power savings mode in which any one or more of the regulators may be temporarily suspended or shut down during a low power period. In one power-savings alternative configuration, the delay period of each of the remaining devices is re-programmed to maintain FSW. This first method requires additional control circuitry to enable delay period reprogramming. In another power-savings alternative configuration, the switching frequency of the multi-phase converter is allowed to increase during the low power period, while one or more of the cascaded regulators are off-line. This second method results in reduced efficiency, yet only during low-power periods so that overall efficiency impact is minimized. In yet another power-savings alternative configuration, the delay of the suspended devices remain enabled while output switching circuitry is disabled. This third method results in increased ripple voltage since less devices are contributing to the output voltage, but such is considered acceptable since only applied during low-power periods during which ripple is less of a concern. Also, in this third alternative mode, the particular devices that are suspended may be selected to optimize results, such as by suspending every other device resulting in symmetrical output ripple.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A multi-phase power converter architecture comprising:
   a plurality of N+1 regulators, where N is greater than or equal to one, including a first regulator and N additional regulators coupled in a cascaded configuration;
   said first regulator including
      a programmable delay circuit coupled to receive a clock signal from a controller circuit, said programmable delay circuit providing a digital start output signal to a next downstream regulator after a predetermined delay; and
      a pulse width modulator (PWM) control circuit that controls a PWM output in accordance with said clock signal and a prescribed output condition;
   a respective one of said N additional regulators including
      a programmable delay circuit coupled to receive a digital start output signal from a next upstream regulator, said delay circuit providing a digital start output signal to a next downstream regulator after a predetermined delay; and
      a PWM control circuit that controls a PWM output in accordance with said digital start signal and a prescribed output condition;
   a plurality of N+1 switching circuits, each having an input coupled to a PWM output of one of said plurality of regulators, an output for driving a common DC output voltage, and a sense output provided to a PWM control circuit of said one of said plurality of regulators; and
   a controller that senses said DC output voltage and provides a compensation signal to said PWM control circuits of said plurality of regulators, and which supplies said clock signal to said first regulator.

2. The multi-phase power converter architecture according to claim 1, wherein said PWM control circuit of said respective one of said N additional regulators comprises:
   a PWM logic circuit that controls said PWM output based on assertion of said digital start input signal and a reset signal; and
   a feedback comparator logic circuit, coupled to said PWM logic circuit, that asserts said reset signal based on said compensation signal and a sense output of one of said N switching circuits.

3. The multi-phase power converter architecture according to claim 2, wherein said feedback comparator logic comprises:
a sense amplifier having an output and an input coupled to said sense output of an associated switching circuit; and
a comparator having a first input receiving said compensation signal, a second input coupled to said output of said sense amplifier, and an output that provides said reset signal.

4. The multi-phase power converter architecture according to claim 1, wherein said architecture has a switching frequency FSW defined by programming the delay circuit of each of said N+1 regulators to provide a delay therethrough of 1/(N+1)×FSW).

5. A semi-clockless, cascaded, current-mode regulator comprising
a plurality of first through Nth regulators coupled in a non-looped cascaded arrangement, where N is equal to or greater than one, with only said first regulator being coupled to receive a clock signal from a controller, and
second through said Nth cascaded regulators including delay circuits that are coupled to receive sequentially delayed versions of said clock signal as applied to said first regulator, said regulators controlling the operations of associated pulse width modulation (PWM) controlled switching circuits in response to clock signals applied thereto, with voltage outputs of said PWM controlled switching circuits being combined to realize a multi-phase output voltage.

6. The regulator according to claim 5, wherein said delay circuits are programmable.

7. The regulator according to claim 5, wherein said delay circuits comprise digitally controlled programmable delay circuits.

8. The regulator according to claim 5, wherein a respective regulator comprises:
a PWM logic circuit that controls an associated PWM controlled switching circuit in accordance with an associated clock signal and a reset signal; and
a feedback comparator logic circuit, coupled to said PWM logic circuit, and being operative to assert said reset signal based on a compensation signal and a sense output of one of said PWM controlled switching circuits.

9. The regulator according to claim 8, wherein said feedback comparator logic comprises:
a sense amplifier having an output and an input coupled to a sense output of an associated PWM controlled switching circuit; and
a comparator having a first input receiving said compensation signal, a second input coupled to said output of said sense amplifier, and an output that provides said reset signal.

10. The regulator according to claim 5, wherein said regulator has a switching frequency FSW defined by programming each delay circuit to provide a delay therethrough of 1/(N×FSW).

11. A method of generating a regulated multi-phase output voltage comprising the steps of:
(a) cascading a plurality of first through Nth voltage regulators in a non-looped arrangement, where N is equal to or greater than one, each voltage regulator including a delay circuit;
(b) coupling a clock signal to the delay circuit of said first voltage regulator, and propagating said clock circuit through the delay circuit thereof and delay circuits of second through said Nth voltage regulators, so as to produce sequentially delayed versions of said clock signal in sequentially cascaded voltage regulators, a respective voltage regulator controlling the operation of an associated pulse width modulation (PWM) controlled switching circuit in response to the clock signal applied thereto; and
(c) combining voltage outputs of said PWM controlled switching circuits to realize a multi-phase output voltage.

12. The method according to claim 11, wherein said delay circuits are programmable.

13. The method according to claim 11, wherein said delay circuits comprise digitally controlled programmable delay circuits.

14. The method according to claim 11, wherein a respective voltage regulator comprises:
a PWM logic circuit that controls an associated PWM controlled switching circuit in accordance with an associated clock signal and a reset signal; and
a feedback comparator logic circuit, coupled to said PWM logic circuit, and being operative to assert said reset signal based on a compensation signal and a sense output of one of said PWM controlled switching circuits.

15. The method according to claim 14, wherein said feedback comparator logic comprises:
a sense amplifier having an output and an input coupled to a sense output of an associated PWM controlled switching circuit; and
a comparator having a first input receiving said compensation signal, a second input coupled to said output of said sense amplifier, and an output that provides said reset signal.

16. The method according to claim 11, wherein said multi-phase output voltage has a switching frequency FSW defined by programming each delay circuit to provide a delay therethrough of 1/(N×FSW).

17. The method according to claim 11, wherein step (b) includes temporarily shutting down the operation of one or more selected ones of said N voltage regulators during a low power mode of operation.

18. The method according to claim 17, wherein step (b) includes reprogramming the delays imparted by delay circuits of active ones of said cascaded voltage regulators to maintain a prescribed switching frequency FSW.

19. The method according to claim 17, wherein step (b) includes increasing the switching frequency FSW during low power mode of operation during which one or more of said voltage regulators is shut down.

20. The method according to claim 17, wherein step (b) includes disabling PWM controlled switching circuits of said selected voltage regulators while allowing said clock signal to sequentially propagate through delay circuits of said first through Nth voltage regulators.

* * * * *